US010084562B2

(12) United States Patent
Abdoli et al.

(10) Patent No.: US 10,084,562 B2
(45) Date of Patent: Sep. 25, 2018

(54) SYSTEM AND METHOD FOR FILTERED OFDM

(71) Applicant: Huawei Technologies Co., Ltd., Shenzhen (CN)

(72) Inventors: Javad Abdoli, Kanata (CA); Ming Jia, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/493,671

(22) Filed: Apr. 21, 2017

(65) Prior Publication Data

US 2018/0054268 A1   Feb. 22, 2018

Related U.S. Application Data

(60) Provisional application No. 62/377,880, filed on Aug. 22, 2016.

(51) Int. Cl.
*H04L 27/28* (2006.01)
*H04J 11/00* (2006.01)
*H04L 5/00* (2006.01)

(52) U.S. Cl.
CPC ......... *H04J 11/0023* (2013.01); *H04L 5/0053* (2013.01)

(58) Field of Classification Search
CPC ............. H04L 27/2649; H04L 27/2602; H04L 27/264; H04L 27/2656; H04L 27/265; H04L 27/2655; H04L 27/2607; H04L 27/2647; H04L 2027/0095
See application file for complete search history.

(56) References Cited

U.S. PATENT DOCUMENTS

| 5,818,827 A | 10/1998 | Usui et al. | |
|---|---|---|---|
| 2015/0280886 A1* | 10/2015 | Abdoli | H04L 5/0066 370/336 |
| 2016/0211998 A1* | 7/2016 | Sun | H04L 27/264 |
| 2016/0380689 A1* | 12/2016 | Sun | H04L 1/206 370/330 |
| 2017/0026154 A1 | 1/2017 | Ratnakar | |
| 2017/0207941 A1* | 7/2017 | Park | H04L 27/2605 |

FOREIGN PATENT DOCUMENTS

| CN | 103248598 A | 8/2013 |
|---|---|---|
| CN | 105009537 A | 10/2015 |
| WO | 2015120814 A1 | 8/2015 |

OTHER PUBLICATIONS

"Delay analysis for f-OFDM", 3GPP TSG RAN Meeting WG1 #86bis R1-1608826, Lisbon, Portugal, Oct. 10-14, 2016, 6 pages.
(Continued)

*Primary Examiner* — Kanh C Tran
(74) *Attorney, Agent, or Firm* — Slater Matsil, LLP

(57) ABSTRACT

A method includes generating, by a transmitter, an original OFDM signal having at least one OFDM symbol, the at least one OFDM symbol having an associated time domain tail; truncating, by the transmitter, at least a portion of the time domain tail to produce a truncated OFDM signal; and transmitting, by the transmitter, the truncated OFDM signal.

25 Claims, 9 Drawing Sheets

(56) References Cited

OTHER PUBLICATIONS

"5G-Waveform Candidate-fOFDMF-5G", www.sharetechnote.com, retrieved May 9, 2017, 2 pages.
Zang, X., et al, "Filtered-OFDM Enabler for Flexible Waveform in The 5th Generation Cellular Networks," IEEE Globecom, Dec. 2015, pp. 1-6, San Diego, CA.
Huawei, et al.,"OFDM based flexible waveform for 5G," 3GPP TSG RAN WG1 Meeting #84bis, R1-162152, Apr. 11-15, 2016, 10 pages, Busan, Korea.
Spreadtrum Communications,"Considerations on waveform design for new RAT," 3GPP TSG RAN WG1 Meeting #84 bis, R1-162548, Apr. 11-15, 2016, 2 pages, Busan, Korea.
Altera University Program "5G: The 1st 5G Algorithm Innovation Competition F-OFDM", Presentation, May 21, 2016. 24 pages.

\* cited by examiner

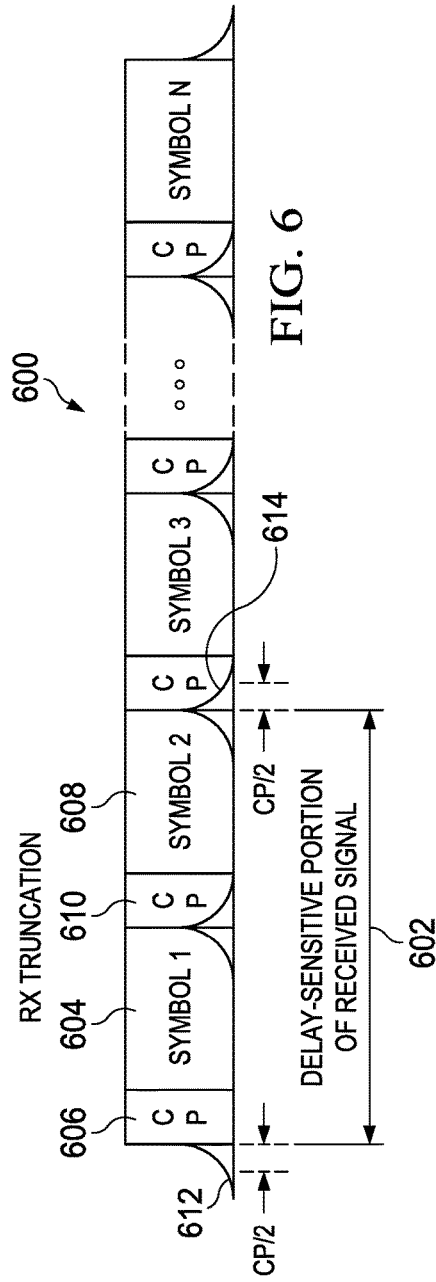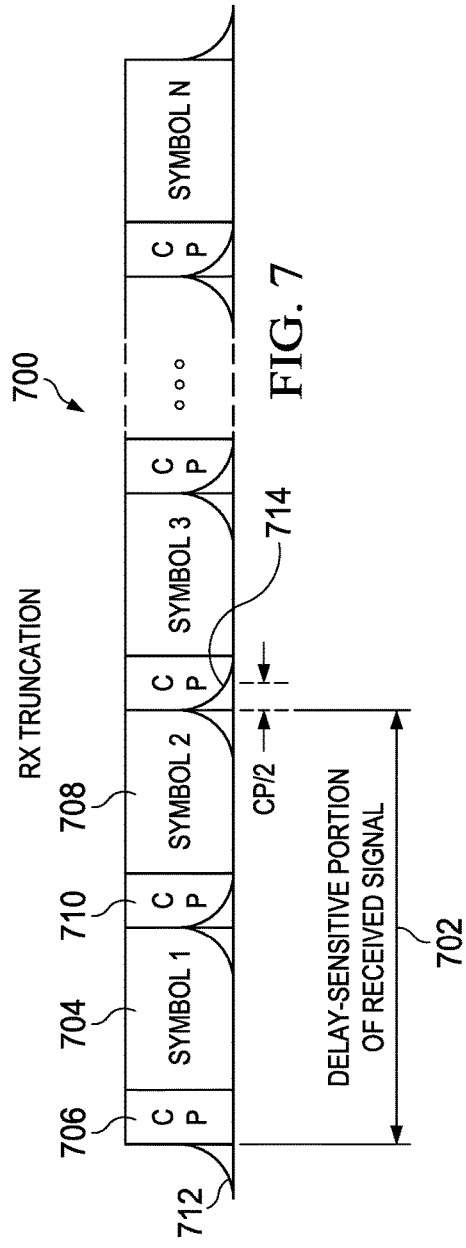

SYSTEM AND METHOD FOR FILTERED OFDM

This application claims priority to U.S. Provisional Patent Application No. 62/377,880, filed Aug. 22, 2016, entitled "System and Method for Filtered OFDM," which provisional application is hereby incorporated herein by reference.

TECHNICAL FIELD

The present disclosure relates generally to wireless communication, and, in particular embodiments, to a system and method for filtered OFDM.

BACKGROUND

Orthogonal frequency-division multiplexing (OFDM) is a method of encoding digital data on multiple carrier frequencies. The OFDM scheme is currently deployed in broadband multicarrier communications. However, OFDM suffers from high out of band (OOB) radiation due to the use of a square pulse (i.e., a sinc function in the frequency domain) on each subcarrier. A guard band can be used to mitigate interference between two bands due to OOB radiation. OFDM/Offset Quadrature Amplitude Modulation (OQAM) is a filter bank multicarrier (FBMC) scheme which uses a time/frequency localized pulse shaping over each subcarrier to yield a spectrally contained waveform. This scheme provides a relatively well contained spectrum and is suitable for synchronous/asynchronous communications. Other FBMC schemes can also be considered. In the OFDM scheme, the guard band is not used to transmit data, which results in loss of spectral efficiency.

SUMMARY

In accordance with an embodiment of the present disclosure, a method includes generating, by a transmitter, an original OFDM signal having at least one OFDM symbol, the at least one OFDM symbol having an associated time domain tail; truncating, by the transmitter, at least a portion of the time domain tail to produce a truncated OFDM signal; and transmitting, by the transmitter, the truncated OFDM signal.

In the previous embodiment, the time domain tail might be produced by filtering of the original OFDM signal by the transmitter. In any of the previous embodiments, the time domain tail might be a leading tail that is transmitted before transmission of a first cyclic prefix of the truncated OFDM signal, and the truncating might comprise refraining from transmitting an initial portion of the leading tail in the time domain. In any of the previous embodiments, the time domain tail might be a trailing tail that is transmitted after transmission of a last OFDM symbol of the truncated OFDM signal, and the truncating might comprise refraining from transmitting a final portion of the trailing tail in the time domain. In any of the previous embodiments, a length of the time domain tail after the truncating might be specified to be a fraction of at least one of a length of a single OFDM symbol of the original OFDM signal or a length of a cyclic prefix of the original OFDM signal.

In accordance with an embodiment of the present disclosure, a method includes receiving, by a receiver, an original OFDM signal having at least one OFDM symbol, the at least one OFDM symbol having an associated time domain tail; truncating, by the receiver, at least a portion of the time domain tail to produce a truncated OFDM signal; and processing, by the receiver, the truncated OFDM signal.

In the previous embodiment, the time domain tail might be a trailing tail that is transmitted after transmission of a last OFDM symbol of the original OFDM signal, and the truncating might comprise ending processing of the last OFDM symbol before the trailing tail has ended in the time domain. In any of the previous embodiments, a length of the time domain tail after the truncating might be specified to be a fraction of at least one of a length of a single OFDM symbol of the original OFDM signal or a length of a cyclic prefix of the original OFDM signal. In any of the previous embodiments, the truncating might be performed on a delay-sensitive portion of the original OFDM signal that is processed before any other portion of the original OFDM signal is processed. In any of the previous embodiments, the method might further comprise using a result of the processing of the delay-sensitive portion in processing at least one other portion of the original OFDM signal. In any of the previous embodiments, the delay-sensitive portion might include a trailing tail that is transmitted after transmission of a last OFDM symbol of the delay-sensitive portion, the truncating might be performed on the trailing tail, and the truncating might comprise ending processing of the trailing tail before the trailing tail has ended in the time domain. In any of the previous embodiments, processing of the last OFDM symbol of the delay-sensitive portion might begin before the entire trailing tail is received.

In accordance with an embodiment of the present disclosure, a transmitter includes a non-transitory memory storage comprising instructions and one or more processors in communication with the memory storage. The one or more processors execute the instructions to generate an original OFDM signal having at least one OFDM symbol, the at least one OFDM symbol having an associated time domain tail; truncate at least a portion of the time domain tail to produce a truncated OFDM signal; and transmit the truncated OFDM signal.

In the previous embodiment, the time domain tail might be produced by filtering of the original OFDM signal by the transmitter. In any of the previous embodiments, the time domain tail might be a leading tail that is transmitted before transmission of a first cyclic prefix of the truncated OFDM signal, and the truncating might comprise refraining from transmitting an initial portion of the leading tail in the time domain. In any of the previous embodiments, the time domain tail might be a trailing tail that is transmitted after transmission of a last OFDM symbol of the truncated OFDM signal, and the truncating might comprise refraining from transmitting a final portion of the trailing tail in the time domain. In any of the previous embodiments, a length of the OFDM tail after the truncating might be specified to be a fraction of at least one of a length of a single OFDM symbol of the original OFDM signal or a length of a cyclic prefix of the original OFDM signal.

In accordance with an embodiment of the present disclosure, a receiver includes a non-transitory memory storage comprising instructions and one or more processors in communication with the memory storage. The one or more processors execute the instructions to receive an original OFDM signal having at least one OFDM symbol, the at least one OFDM symbol having an associated time domain tail; truncate at least a portion of the time domain tail to produce a truncated OFDM signal; and process the truncated OFDM signal.

In the previous embodiment, the time domain tail might be a trailing tail that is transmitted after transmission of a last OFDM symbol of the original OFDM signal, and the truncating might comprise ending processing of the last OFDM symbol before the trailing tail has ended in the time domain. In any of the previous embodiments, a length of the OFDM tail after the truncating might be specified to be a fraction of at least one of a length of a single OFDM symbol of the original OFDM signal or a length of a cyclic prefix of the original OFDM signal. In any of the previous embodiments, truncation might be performed on a delay-sensitive portion of the original OFDM signal that is processed before any other portion of the original OFDM signal is processed. In any of the previous embodiments, the one or more processors might further execute the instructions to use a result of the processing of the delay-sensitive portion in processing at least one other portion of the original OFDM signal. In any of the previous embodiments, the delay-sensitive portion might include a trailing tail that is transmitted after transmission of a last OFDM symbol of the delay-sensitive portion, truncation might be performed on the trailing tail, and the truncation might comprise ending processing of the trailing tail before the trailing tail has ended in the time domain. In any of the previous embodiments, processing of the last OFDM symbol of the delay-sensitive portion might begin before the entire trailing tail is received.

BRIEF DESCRIPTION OF THE DRAWINGS

For a more complete understanding of the present disclosure, and the advantages thereof, reference is now made to the following description taken in conjunction with the accompanying drawings, in which:

FIG. 6 is a diagram of truncation of tails in a received f-OFDM signal, according to some embodiments;

FIG. 7 is another diagram of truncation of tails in a received f-OFDM signal, according to some embodiments;

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Figure 1:
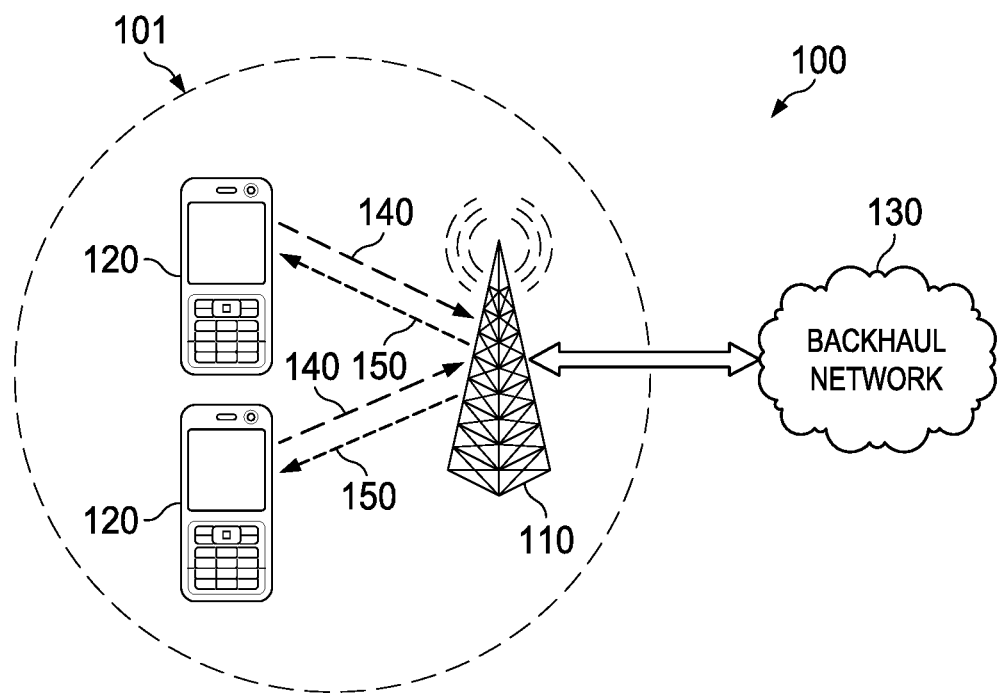
FIG. 1 is a diagram of a network.

FIG. 1 is a diagram of a network 100 for communicating data. The network 100 comprises a base station 110 having a coverage area 101, a plurality of mobile devices 120, and a backhaul network 130. As shown, the base station 110 establishes uplink connections 140 and downlink connections 150 with the mobile devices 120, which serve to carry data from the mobile devices 120 to the base station 110 and vice versa. Data carried over the uplink and downlink connections 140 and 150 may include data communicated between the mobile devices 120, as well as data communicated to and from a remote end (not shown) by way of the backhaul network 130. As used herein, the term "base station" may refer to any component or collection of components configured to provide wireless access to a network, such as an evolved NodeB (eNB), a macro-cell, a femtocell, a Wi-Fi access point (AP), or other wirelessly enabled devices. Base stations may provide wireless access in accordance with one or more wireless communication protocols, such as Long Term Evolution (LTE), LTE Advanced (LTE-A), High Speed Packet Access (HSPA), or Wi-Fi 802.11a/b/g/n/ac. As used herein, the term "mobile device" may refer to any component or collection of components capable of establishing a wireless connection with a base station, such as a user equipment (UE), a mobile station (STA), or other wirelessly enabled devices. In some embodiments, the network 100 may comprise various other wireless devices, such as relays or low power nodes.

Filtered OFDM (f-OFDM) is a scheme in which filtering is applied to a sequence of OFDM symbols to reduce OOB radiation. The f-OFDM scheme has the benefits of OFDM, such as simple equalization, channel estimation, and suitability for multiple-input and multiple-output (MIMO) transmissions. The assigned bandwidth in an f-OFDM signal is split into several sub-bands each having different waveform and numerology characteristics. Different types of services might be provided in each sub-band based on the most suitable waveform and numerology. Such distribution of services to different sub-bands with different characteristics might lead to improved spectrum utilization.

The f-OFDM waveform might have some use in proposed future networks, sometimes called Fifth Generation (5G) applications, and in particular, applications operating at frequencies below 6 GHz. To generate an f-OFDM signal, an OFDM signal is filtered to attenuate side lobes of the OFDM signal that are positioned outside the allocated bandwidth. This enables data to be transmitted over essentially the entire allocated bandwidth, without relying on a guard band to mitigate interference between adjacent channels. The filter that is used to generate the f-OFDM signal is referred to as an "f-OFDM filter" throughout this disclosure. The complexity of the f-OFDM filter is heavily influenced by the overall bandwidth of the signal being filtered. In particular, the complexity of the f-OFDM filter generally refers to the number of taps in the f-OFDM filter, which is based on the number of samples in each OFDM symbol in the signal. Because the sampling rate must generally be at least twice the bandwidth of the signal (½ fs cycles/second (Hertz)) to satisfy the Nyquist criterion, f-OFDM filters must have more taps to filter higher bandwidth signals. The length for an f-OFDM filter may be calculated according to T/2, where T is the duration of OFDM symbols in the f-OFDM signal. For a subcarrier spacing of 15 kHz, the filter length is approximately:

$$\frac{1}{2*15000 \text{ Hz}} \cong 33.33 \text{ μs}.$$

f-OFDM waveforms might be transmitted using time division duplexing (TDD). Some f-OFDM filtering is performed in the time domain as convolution operations. The convolution operations involved in the filtering taps for an f-OFDM waveform introduce or elongate a time domain tail (also described herein as a "tail") in the filtered signal.

The embodiments disclosed herein may be discussed in the context of the tails that occur in f-OFDM waveforms. However, it should be understood that the embodiments are applicable to any waveform in which tails occur and are not limited to f-OFDM tails.

Figure 2:
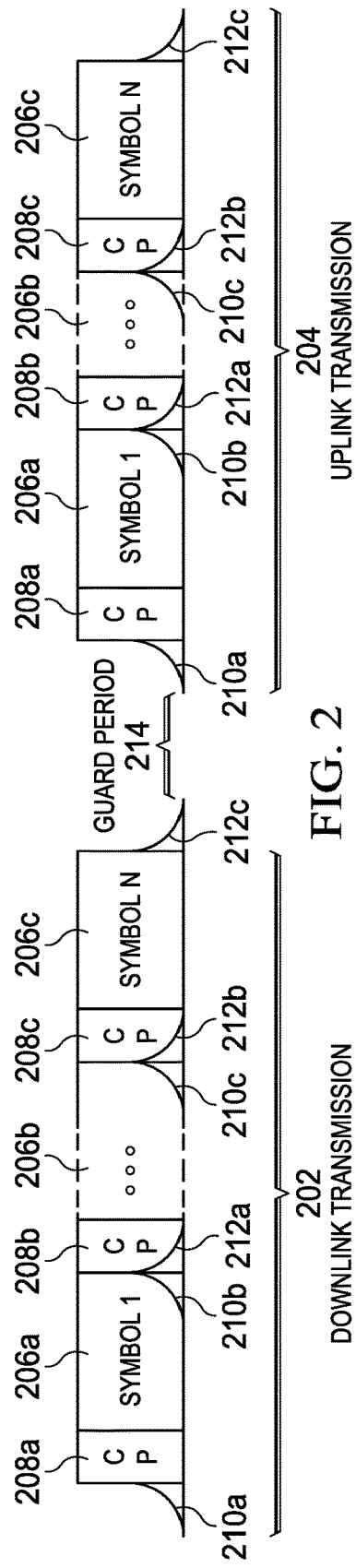
FIG. 2 is a diagram of a downlink transmission with tails and an uplink transmission with tails, according to some embodiments.

FIG. 2 is a diagram of a downlink transmission 202 and an uplink transmission 204 that include tails such as those that might occur in f-OFDM waveforms. Each transmission includes several symbols 206, each of which is preceded by a cyclic prefix 208. Each symbol 206 has a leading tail 210 before its cyclic prefix 208 and a trailing tail 212 after the symbol 206. The term "symbol" as used herein refers only to the symbol portion 206.

As can be seen in FIG. 2, the leading tails 210 overlap with the preceding symbols 206, and the trailing tails 212 overlap with the succeeding cyclic prefixes 208. Each transmission 202 and 204 has a leading tail 210a that lies outside the first cyclic prefix 208a and a trailing tail 212c that lies outside the last symbol 206c. The leading tails 210 and the trailing tails 212 may also be referred to herein as pre-tails and post-tails, respectively.

A guard period 214 is a time period the transmitter waits between the downlink transmission 202 and the uplink transmission 204. The duration of the guard period 214 depends on the switching time (e.g., from downlink to uplink) at the receiver and the roundtrip delay of the cell, which depends on the size of the cell. The value of the guard period 214 is determined by the network. In LTE TDD, different values for the guard period 214 are provided based on the cell size. In LTE, the guard period 214 might have a length of between about 1 OFDM symbol and about 10 OFDM symbols.

Transmission of a signal that includes tails might increase the time domain overhead, because the tails that lie outside the first and last symbols of a transmission might carry little or no usable data but might still need to be transmitted. Reception of a signal that includes tails might increase the processing delay, because the tails might carry little or no usable data but might still need to be processed.

Embodiment techniques truncate one or more tails that are present in a transmitted and/or received TDD signal to reduce the time domain overhead and/or processing delay introduced by TDD-related tails, such as those that might occur in f-OFDM waveforms. In some embodiments, a tail is truncated from a signal before the signal is transmitted. In some embodiments, a tail is truncated from a portion of a received signal and only the remainder of the signal is processed. The energy of a signal tail decays quickly in the time domain. Therefore, although the tail might be long, significant portions of the tail length might be truncated without significant signal loss.

Truncating a signal tail before transmission might achieve the advantage of reducing the time domain overhead in the transmitter. Truncating a received signal tail and processing only the remainder of the signal might achieve the advantage of reducing the processing delay in the receiver.

Figure 3:
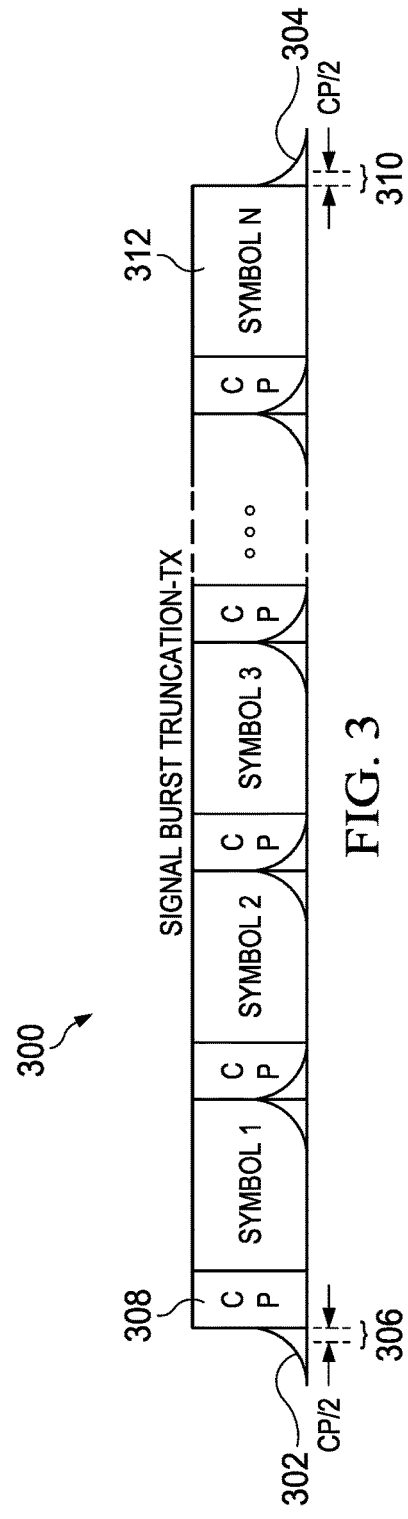
FIG. 3 is a diagram of truncation of tails in a transmission f-OFDM signal, according to some embodiments.

FIG. 3 is a diagram illustrating truncation of tails in an f-OFDM transmission signal burst 300 (i.e., a series of symbols), according to some embodiments. For the sake of clarity in this and subsequent signal burst drawings, reference numbers are not provided for the symbols, cyclic prefixes, and tails unless a specific symbol, cyclic prefix, or tail is referred to, but it should be understood that the symbols, cyclic prefixes, and non-truncated tails in this and subsequent signal burst drawings may be similar to those in FIG. 2.

In an embodiment, tails of the f-OFDM signal burst 300, or some other TDD-related signal burst, are truncated before transmission. In particular, a tail 302 at the leading portion of the signal burst 300 and a tail 304 at the trailing portion of the signal burst 300 are truncated before transmission. That is, a portion 306 of the leading tail 302 adjacent to the first cyclic prefix 308 of the signal burst 300 is retained, and the remainder of the leading tail 302 is truncated. Similarly, a portion 310 of the trailing tail 304 adjacent to the last symbol 312 of the signal burst 300 is retained, and the remainder of the trailing tail 304 is truncated. Truncation of the leading tail 302 might be accomplished by refraining from transmitting an initial portion of the leading tail 302 in the time domain. Truncation of the trailing tail 304 might be accomplished by refraining from transmitting a final portion of the trailing tail 304 in the time domain. Truncation of tails that lie wholly within a symbol or wholly within a cyclic prefix might not be necessary, because such tails do not incur any additional overhead.

In an embodiment, the length of the leading tail 302 and the trailing tail 304 of the signal burst 300 remaining after truncation is equal to one half the length of a cyclic prefix. (CP/2 in the drawing). In other embodiments, the amount of a tail remaining after truncation might be some other fraction of a cyclic prefix or some other value.

Alternatively, the amount of a tail that is truncated might be related to the length of a symbol. Before truncation, the leading tail 302 and the trailing tail 304 might each have a length of approximately 25% of the duration of a symbol. In an embodiment, the amounts of a tail that are truncated and that are retained are equal, and thus, after truncation, the remaining length of each of the leading tail 302 and the trailing tail 304 is about 3.5% of the length of a symbol. In other embodiments, the amount of a tail that is truncated and the amount that is retained might be other percentages of the length of a symbol.

Figure 4:
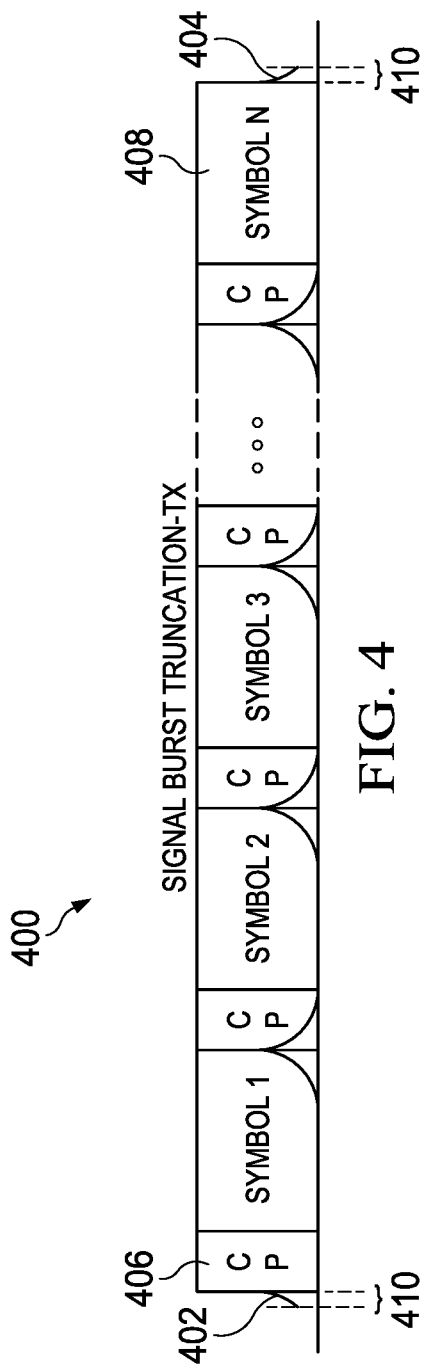
FIG. 4 is a diagram of a transmission f-OFDM signal with truncated tails, according to some embodiments.

FIG. 4 shows an f-OFDM transmission signal burst 400, such as the f-OFDM transmission signal burst 300 of FIG. 3, with a truncated leading tail and a truncated trailing tail. As can be seen, a portion 402 of the leading tail adjacent to the first cyclic prefix 406 of the signal burst 400 has been retained, and the remainder of the leading tail is no longer present. Similarly, a portion 404 of the trailing tail adjacent to the last symbol 408 of the signal burst 400 has been retained, and the remainder of the trailing tail is no longer present. That is, the leading tail and the trailing tail each have a width 410 equal to their original width minus the width of the portion that was truncated. In an embodiment, the width 410 of each tail is equal to half the width of a cyclic prefix, but in other embodiments the remaining tails might have other widths. It may be noted that, although the leading and trailing tails are described and depicted herein as having equal widths, the leading and trailing tails might have different widths.

Figure 5:
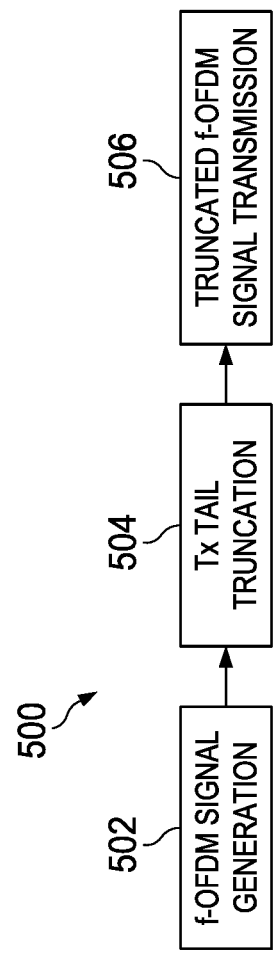
FIG. 5 is a diagram of a method of generation and tail truncation of an f-OFDM signal, according to some embodiments.

FIG. 5 illustrates an embodiment method 500 for truncation of tails in a transmission signal. In step 502, a transmitter generates an f-OFDM signal with leading and trailing tails. In step 504, the transmitter truncates the leading and trailing tails of the signal. The transmitter then transmits the truncated f-OFDM signal in step 506.

A guard period for the signal bursts 300 and 400 might begin after the truncated trailing tail is transmitted. During a portion of the guard period, the transmitter of the signal bursts 300 and 400 might switch between downlink and uplink operations. The leading and trailing tails for the signal bursts 300 and 400 might have a total length of one cyclic prefix, which is relatively short compared to the length of the guard period. Therefore, the truncated tails might be easily absorbed into the relatively long guard period with minimal impact.

Truncating the leading and trailing tails of a transmitted signal might deteriorate the stopband emission floor, but might not significantly impact the transition band for the power spectral density (PSD) of the signal. The guard band overhead is primarily determined by the out of band emissions (OOBE) performance in the transition band, e.g., the rate at which the PSD for the signals attenuates. f-OFDM waveforms tend to have a localized PSD.

At the receiver side, non-truncated tails might be present in a received signal for at least two reasons. One reason is that, if the truncation described above is not performed on a transmission signal, then the full outer tails 210a and 212c in FIG. 2 will be present on the transmission signal received at the receiver. Another reason is that the truncation described above is performed only on the outer tails 210a and 212c of the transmission signal, and thus non-truncated tails will be present in the inner portion of the transmission signal. As mentioned above, the presence of tails in a received signal might increase processing delay in the receiver of the signal. That is, the receiver might process a tail within a symbol or cyclic prefix in addition to processing the symbol or cyclic prefix itself, thus causing the processor to perform processing steps that might be unnecessary.

In an embodiment, one or more tails of a received f-OFDM signal burst, or some other TDD-related or frequency division duplexing (FDD)-related signal burst, are truncated during reception. Truncation of a trailing tail might be accomplished by ending processing of the trailing tail before the trailing tail has ended in the time domain. In particular, one or more tails of a delay-sensitive portion of a signal burst might be truncated. Delay-sensitive portions might include, for example, portions of the received signal used for processing remaining portions of the received signal or portions of the received signal that, for some other reason, need to be processed before other portions of the received signal.

In an embodiment, as a receiver receives an f-OFDM signal or other signal with tails, the receiver begins decoding delay-sensitive portions of the signal without waiting for remaining portions of the signal, including the trailing tail for the delay-sensitive portions, to be received. In such a way, portions of the trailing tail of the delay-sensitive portions of the received signal are truncated during decoding, by nature of being excluded from the decoding. That is, the receiver might begin processing the trailing tail of the delay-sensitive portions of the received signal before the entire trailing tail is received. The receiver might begin processing the delay-sensitive portions while the trailing tail is still being received. The receiver might stop processing the trailing tail before the entire trailing tail is received, thereby truncating the trailing tail. The delay-sensitive portions remaining after truncation might be processed first, before the remainder of the received signal is received and processed. The remaining delay-sensitive portions might be processed by the f-OFDM receive processing chain, including operations such as receive filtering and OFDM processing, separately from other portions of the signal. The remainder of the received signal might be processed without using any portions of any tails that were removed in the truncation.

FIG. 6 illustrates an embodiment of truncation of a received f-OFDM signal burst 600. In this embodiment, a delay-sensitive portion 602 of the received signal burst 600 is the initial portion of the received signal burst 600. In this example, the delay-sensitive portion 602 includes a first symbol 604 and its associated cyclic prefix 606 and a second symbol 608 and its associated cyclic prefix 610. In this embodiment, the pre-tail 612 adjacent to the first cyclic prefix 606 of the delay-sensitive portion 602 is truncated, and the post-tail 614 adjacent to the second symbol 608 of the delay-sensitive portion 602 is truncated. However, as described below, truncation of the pre-tail 612 might not actually occur. The lengths of the pre-tail 612 and post-tail 614 after truncation are equal to one half of the length of the cyclic prefix in this embodiment, but in other embodiments other amounts of the pre-tail 612 and the post-tail 614 might remain after truncation.

Truncation might not actually occur to the pre-tail of a received signal, because the entire pre-tail might already be received before processing of an associated symbol begins. Therefore, in actual practice, truncation of the tails of a received signal might occur only on the post-tails and not on the pre-tails. FIG. 7 illustrates such a scenario. A received signal burst 700 includes a delay-sensitive portion 702 that includes a first symbol 704 and its associated cyclic prefix 706 and a second symbol 708 and its associated cyclic prefix 710. No truncation is performed on a pre-tail 712 of the delay-sensitive portion 702, because the pre-tail 712 is received before truncation can be performed. Only a post-tail 714 of the delay-sensitive portion 702 is truncated. That is, no processing is performed on the post-tail 714 after a designated time period after the end of the last symbol 708 of the delay-sensitive portion 702. The amount of truncation might be the length of a cyclic prefix divided by two or some other value.

Figure 8:
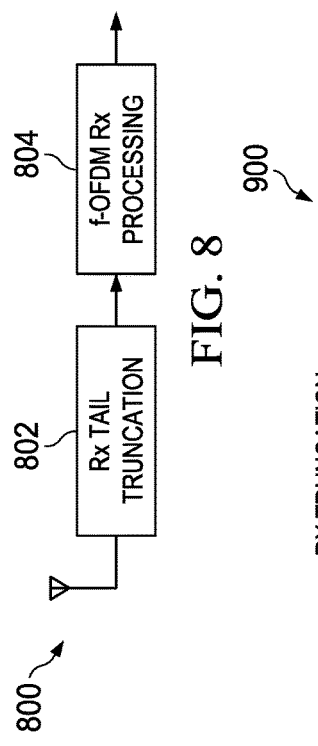
FIG. 8 is a diagram of a method of truncation and processing of a received f-OFDM signal, according to some embodiments.

FIG. 8 illustrates an embodiment method 800 for truncation of tails in a received signal. As a receiver receives an f-OFDM signal, the receiver truncates a tail of the received signal at step 802. The receiver processes the truncated received f-OFDM signal at step 804.

Figure 9:
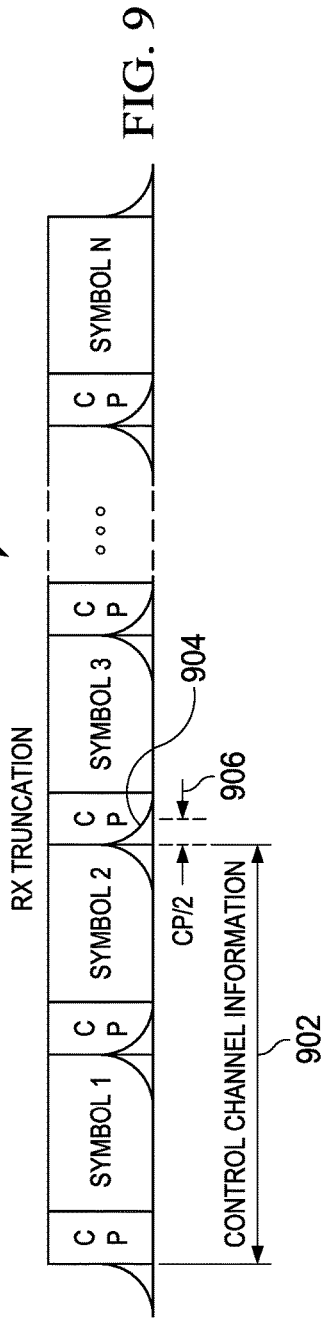
FIG. 9 is a diagram of truncation of tails in a received f-OFDM control channel signal, according to some embodiments.

FIG. 9 illustrates an embodiment where the delay-sensitive portion of a received f-OFDM signal burst 900 is a control channel signal. In this embodiment, the initial portion of the signal burst 900 includes control channel information 902 that might need to be decoded before the data portion of the signal burst 900 can be decoded. Truncation of the post-tail 904 of the delay-sensitive portion is illustrated in FIG. 9, where a portion 906 of the post-tail 904 equal in length to half the length of the cyclic prefix is retained, and a portion of the post-tail 904 outside that portion 906 is truncated. In other embodiments, other portions of the post-tail 904 might be truncated, or a different amount of the post-tail might be retained.

Figure 10:
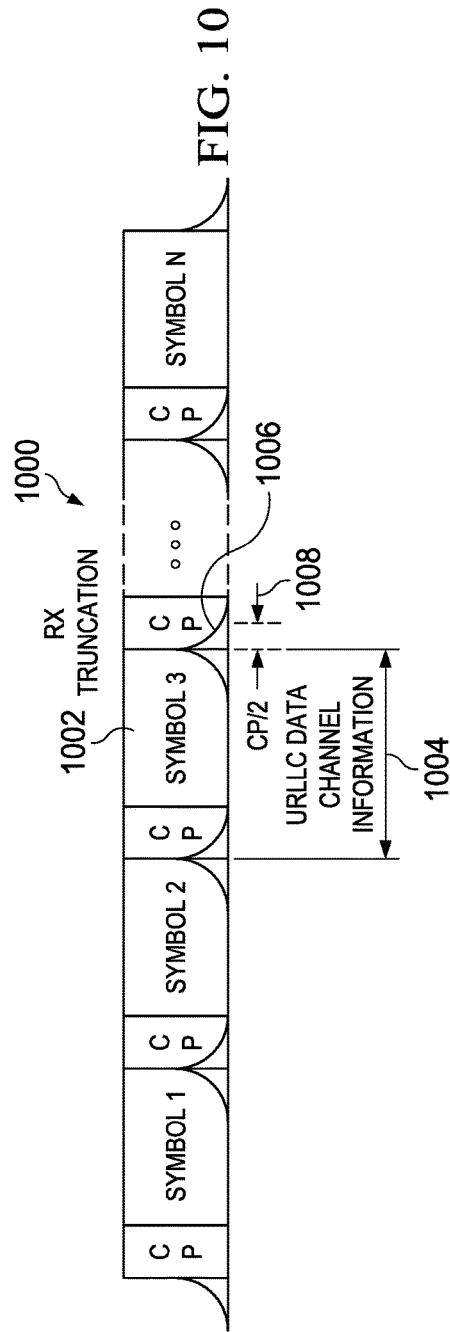
FIG. 10 is a diagram of truncation of tails in a received f-OFDM URLLC data channel signal, according to some embodiments.

FIG. 10 illustrates an embodiment where the delay-sensitive portion of a received f-OFDM signal burst 1000 is an ultra-reliable low latency communication (URLLC) signal. In this embodiment, the third symbol 1002 of the signal burst 1000 includes URLLC data channel information 1004 that might be intended for a URLLC device and might thus need to be decoded before signals intended for other devices. That is, the delay-sensitive portion of the signal burst 1000 is not the initial portion of the signal burst 1000, as in FIG. 9, but instead lies between other symbols of the signal burst 1000 that are not delay-sensitive. Truncation of the post-tail 1006 of the delay-sensitive portion is illustrated in FIG. 10, where a portion 1008 of the post-tail 1006 equal in length to half the length of the cyclic prefix is retained, and a portion of the post-tail 1006 outside that portion 1008 is truncated. In other embodiments, other portions of the post-tail 1006 might be truncated.

Truncating the tails from the delay-sensitive portions of a received signal might not cause significant distortion in the signal because, similarly to the transmitted signals, the energy of the tails decays rapidly, so most of the energy of the tails is in the retained portion. Further, the combinations of the transmit filter, the transmit truncation, the multipath channel impulse response, the receive truncation, and the receive filter might be equalized by an equalizer in the receiver. The equalizer might compensate for the effects of multipath channels. In f-OFDM, the equalizer equalizes a channel from end to end, which includes the transmit filter, the multipath channel, and the receive filter. Further, for asynchronous or mixed numerology scenarios, the receive interference rejection performance is not significantly impacted, because receive filtering might ultimately be performed on the signal.

Figure 11:
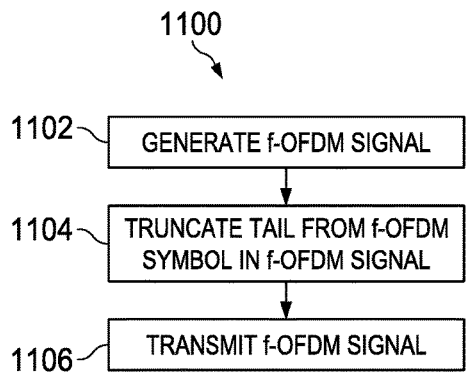
FIG. 11 is a flow diagram of a method for transmitting a truncated f-OFDM signal, according to some embodiments.

FIG. 11 is a flow diagram of a method 1100 for transmitting a truncated signal, according to some embodiments. At block 1102, an f-OFDM signal is generated by a transmitter. The f-OFDM signal includes one or more f-OFDM symbols with tails. At block 1104, the transmitter truncates a tail from one or more f-OFDM symbols in the f-OFDM signal. Truncation of a tail from a symbol might include truncation of a tail from the symbol itself and/or truncation of a tail from a cyclic prefix associated with the symbol. In an embodiment, at least one of the leading or the trailing tail of the signal is truncated. At block 1106, the transmitter transmits the truncated f-OFDM signal.

Figure 12:
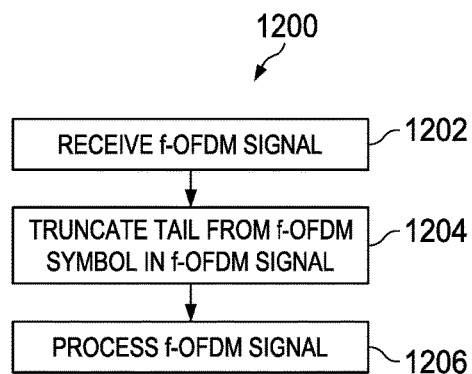
FIG. 12 is a flow diagram of a method for receiving and truncating an f-OFDM signal, according to some embodiments.

FIG. 12 is a flow diagram of a method 1200 for receiving and truncating a signal, according to some embodiments. At block 1202, an f-OFDM signal is received by a receiver. The f-OFDM signal includes one or more f-OFDM symbols with tails. At block 1204, the receiver truncates a tail from one or more f-OFDM symbols in the f-OFDM signal. Truncation of a tail from a symbol might include truncation of a tail from the symbol itself and/or truncation of a tail from a cyclic prefix associated with the symbol. In an embodiment, at least one of the leading or the trailing tail of a delay-sensitive portion of the signal is truncated, and the delay-sensitive portion is then processed. At block 1206, the receiver processes the remaining portions of the f-OFDM signal. The processing of the remaining portions might use information from the delay-sensitive portion on which truncation and processing were previously performed.

Figure 13:
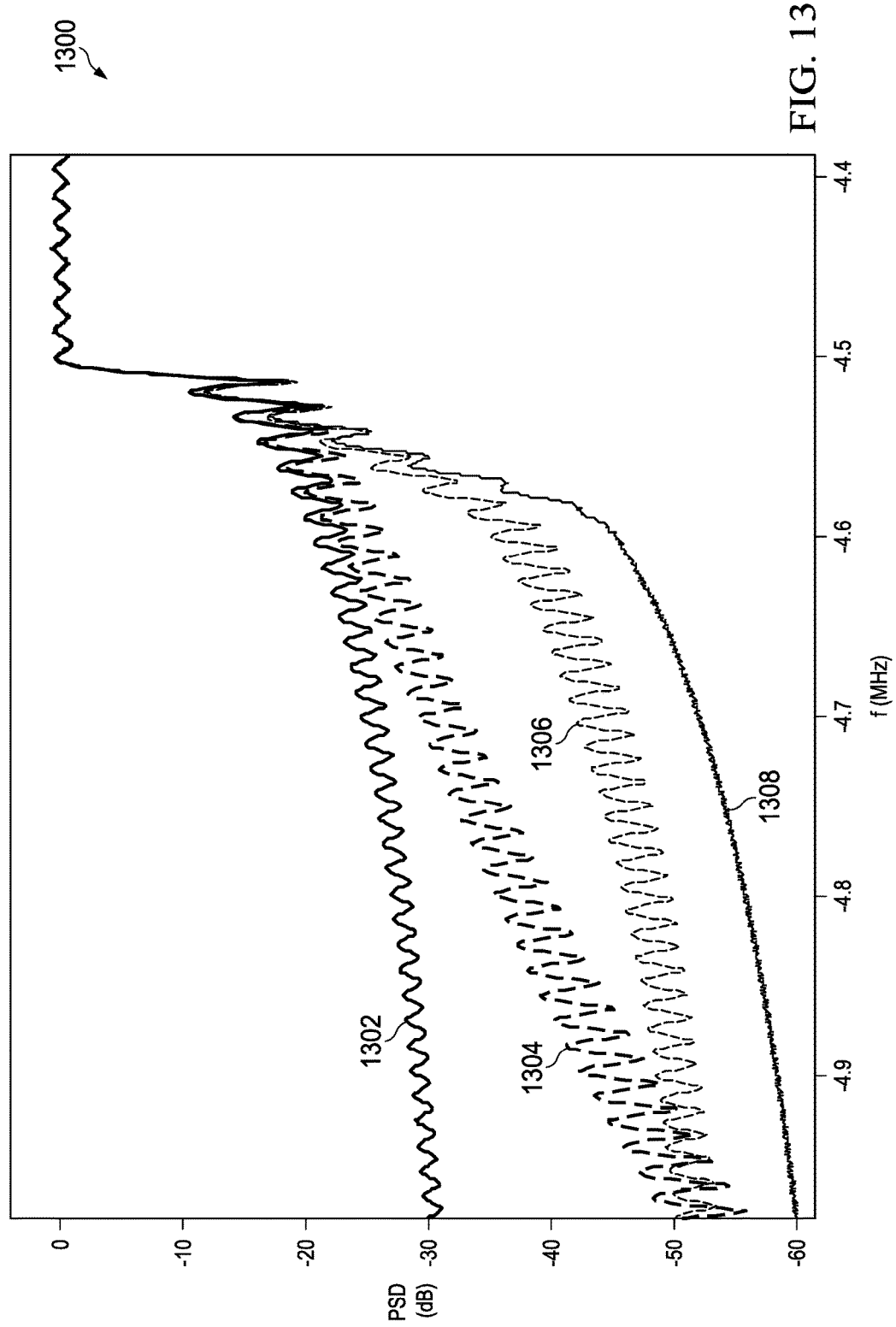
FIG. 13 is a graph showing example PSDs for various OFDM-related transmission signals.

FIG. 13 is a graph 1300 showing example PSDs for various OFDM-related transmission signals. The signals in FIG. 13 were not passed through a power amplifier. A bandwidth of 4 LTE resource blocks (RBs) was used. A first signal 1302 represents standard LTE OFDM. A second signal 1304 represents a version of OFDM known as windowed OFDM (W-OFDM). A third signal 1306 represents f-OFDM with tail truncation as disclosed herein with a transmission time interval (TTI) of 1 OFDM symbol. A fourth signal 1308 represents f-OFDM with tail truncation as disclosed herein with a TTI of 7 OFDM symbols. It can be seen that the truncated signals 1306 and 1308 provide satisfactory performance compared to standard OFDM 1302. As such, the truncated signals 1306 and 1308 have a low guard band overhead.

Figure 14:
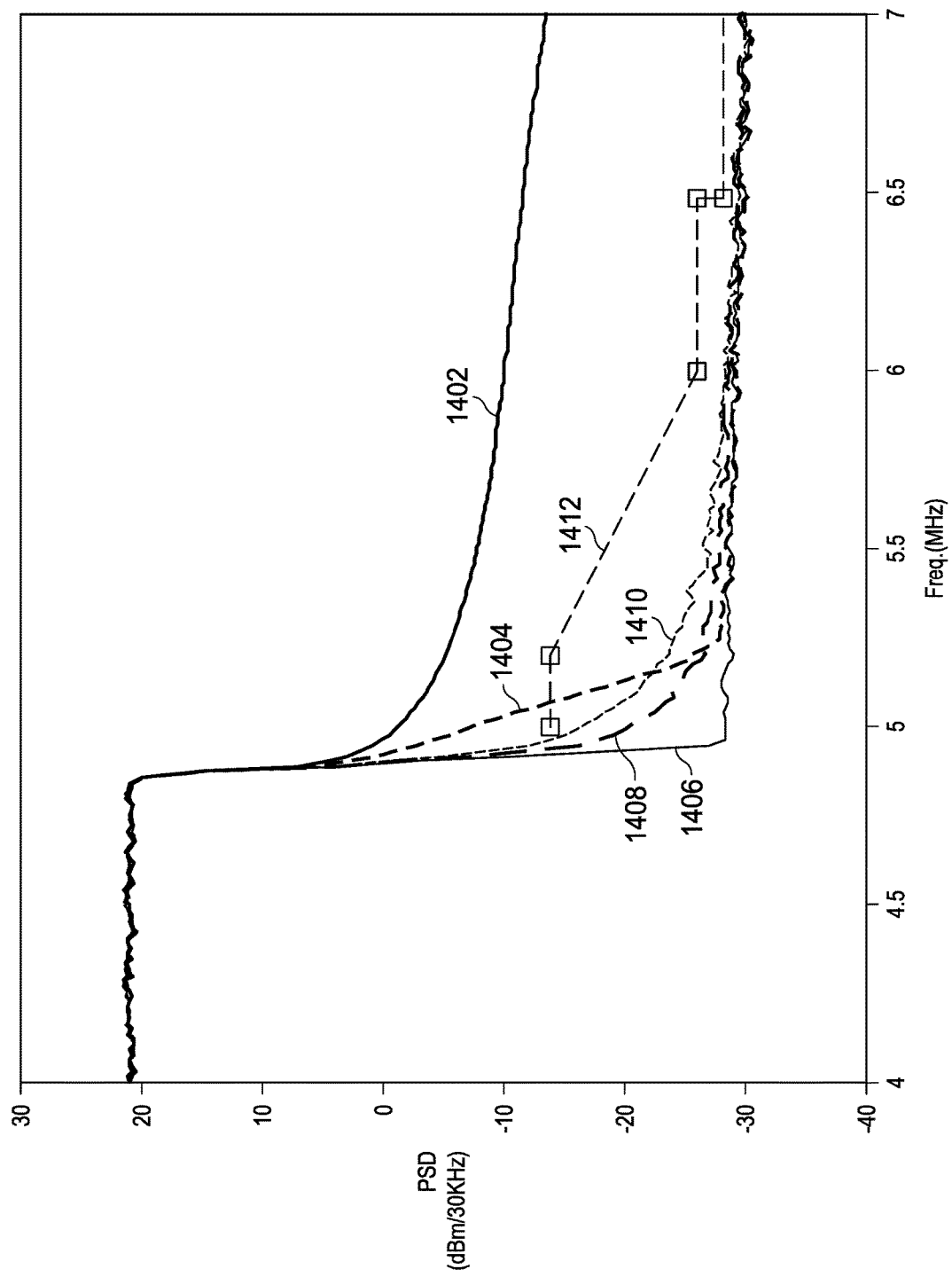
FIG. 14 is a graph showing additional example PSDs for various OFDM-related transmission signals.

FIG. 14 is a graph 1400 showing additional example PSDs for various OFDM-related transmission signals. The signals in FIG. 14 were passed through a power amplifier. A bandwidth of 54 RBs was used. The TTI length for all of the signals was 1 OFDM symbol. A first signal 1402 represents standard OFDM. A second signal 1404 represents W-OFDM. A third signal 1406 represents f-OFDM with no tail truncation. A fourth signal 1408 represents f-OFDM with a smaller amount of the tail truncation disclosed herein. A fifth signal 1410 represents f-OFDM with a larger amount of the tail truncation disclosed herein. A sixth signal 1412 represents the Third Generation Partnership Project (3GPP) spectrum mask. It can be seen that the truncated signals 1408 and 1410 provide satisfactory performance compared to standard OFDM 1402.

Figure 15:
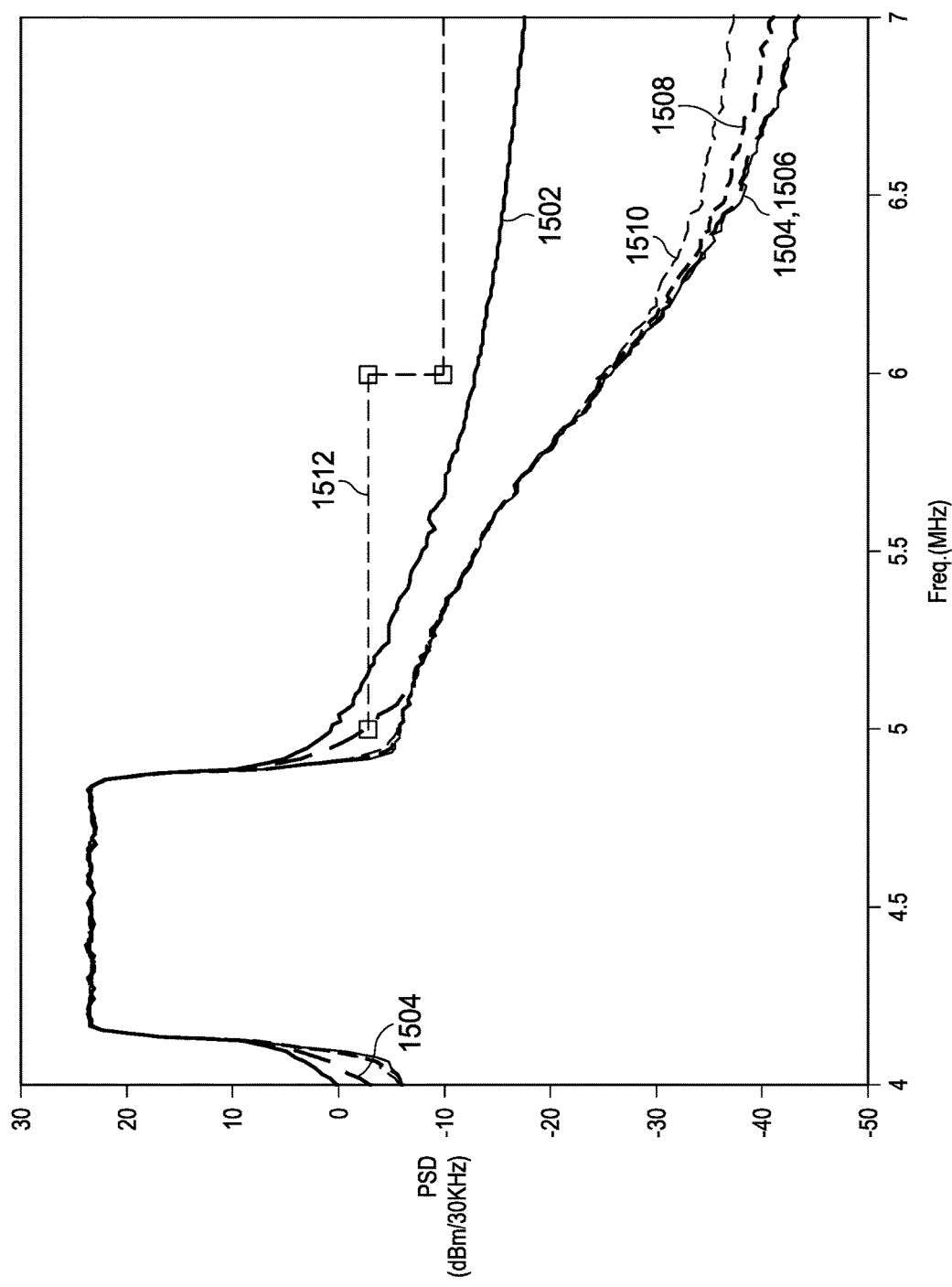
FIG. 15 is a graph showing further example PSDs for various OFDM-related transmission signals.

FIG. 15 is a graph 1500 showing additional example PSDs for various OFDM-related transmission signals. The signals in FIG. 15 were passed through a power amplifier. A bandwidth of 4 RBs was used. The TTI length for all of the signals was 1 OFDM symbol. A first signal 1502 represents standard OFDM. A second signal 1504 represents W-OFDM. A third signal 1506 represents f-OFDM with no tail truncation. The signal 1504 representing W-OFDM and the signal 1506 representing f-OFDM with no tail truncation are almost identical and thus are almost indistinguishable in the graph 1500 except near the low frequency end of the graph 1500. A fourth signal 1508 represents f-OFDM with a smaller amount of the tail truncation disclosed herein. A fifth signal 1510 represents f-OFDM with a larger amount of the tail truncation disclosed herein. A sixth signal 1512 represents the 3GPP spectrum mask. It can be seen that the truncated signals 1508 and 1510 provide satisfactory performance compared to standard OFDM 1502.

Figure 16:
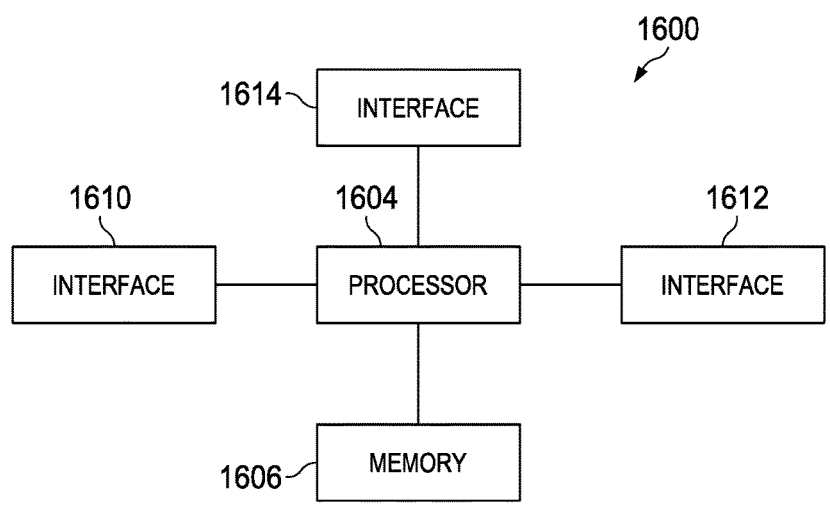
FIG. 16 is a block diagram of an embodiment processing system.

FIG. 16 illustrates a block diagram of an embodiment processing system 1600 for performing methods described herein, which may be installed in a host device. As shown, the processing system 1600 includes a processor 1604, a memory 1606, and interfaces 1610-1614, which may (or may not) be arranged as shown in the figure. The processor 1604 may be any component or collection of components adapted to perform computations and/or other processing related tasks, and the memory 1606 may be any component or collection of components adapted to store programming and/or instructions for execution by the processor 1604. In an embodiment, the memory 1606 includes a non-transitory computer readable medium. The interfaces 1610, 1612, 1614 may be any component or collection of components that allow the processing system 1600 to communicate with other devices/components and/or a user. For example, one or more of the interfaces 1610, 1612, 1614 may be adapted to communicate data, control, or management messages from the processor 1604 to applications installed on the host device and/or a remote device. As another example, one or more of the interfaces 1610, 1612, 1614 may be adapted to allow a user or user device (e.g., personal computer (PC), etc.) to interact/communicate with the processing system 1600. The processing system 1600 may include additional components not depicted in the figure, such as long term storage (e.g., non-volatile memory, etc.).

In some embodiments, the processing system 1600 is included in a network device that is accessing, or part otherwise of, a telecommunications network. In one example, the processing system 1600 is in a network-side device in a wireless or wireline telecommunications network, such as a base station, a relay station, a scheduler, a controller, a gateway, a router, an applications server, or any other device in the telecommunications network. In other embodiments, the processing system 1600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 17:
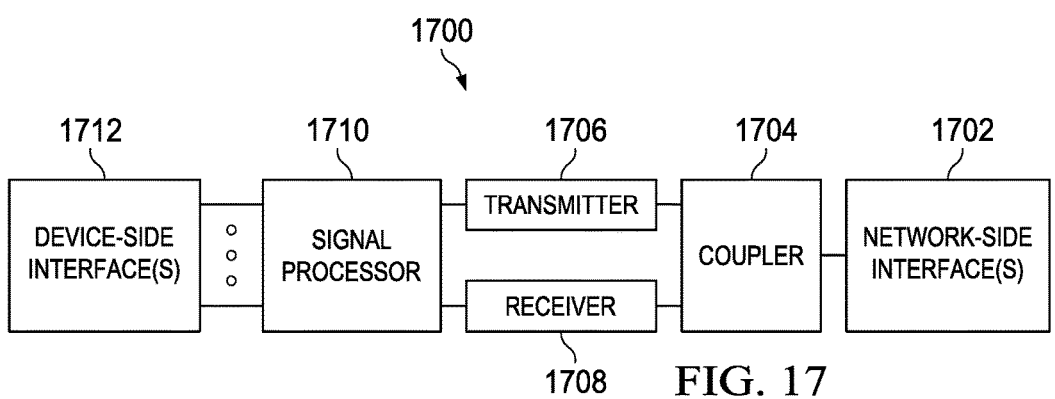
FIG. 17 is a block diagram of a transceiver.

In some embodiments, one or more of the interfaces 1610, 1612, 1614 connects the processing system 1600 to a transceiver adapted to transmit and receive signaling over the telecommunications network. FIG. 17 illustrates a block diagram of a transceiver 1700 adapted to transmit and receive signaling over a telecommunications network. The transceiver 1700 may be installed in a host device. As shown, the transceiver 1700 comprises a network-side interface 1702, a coupler 1704, a transmitter 1706, a receiver 1708, a signal processor 1710, and a device-side interface 1712. The network-side interface 1702 may include any component or collection of components adapted to transmit or receive signaling over a wireless or wireline telecommunications network. The coupler 1704 may include any component or collection of components adapted to facilitate bi-directional communication over the network-side interface 1702. The transmitter 1706 may include any component or collection of components (e.g., up-converter, power amplifier, etc.) adapted to convert a baseband signal into a modulated carrier signal suitable for transmission over the network-side interface 1702. The receiver 1708 may include any component or collection of components (e.g., down-converter, low noise amplifier, etc.) adapted to convert a carrier signal received over the network-side interface 1702 into a baseband signal. The signal processor 1710 may include any component or collection of components adapted to convert a baseband signal into a data signal suitable for communication over the device-side interface(s) 1712, or vice-versa. The device-side interface(s) 1712 may include any component or collection of components adapted to communicate data-signals between the signal processor 1710 and components within the host device (e.g., the processing system 1600, local area network (LAN) ports, etc.).

The transceiver 1700 may transmit and receive signaling over any type of communications medium. In some embodiments, the transceiver 1700 transmits and receives signaling over a wireless medium. For example, the transceiver 1700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1702 comprises one or more antenna/radiating elements. For example, the network-side interface 1702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module and/or a truncating unit/module. The respective units/modules may be hardware, software, or a combination thereof. For instance, one or more of the units/modules may be an integrated circuit, such as field programmable gate arrays (FPGAs) or application-specific integrated circuits (ASICs).

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
   generating, by a transmitter, an original cyclic prefix orthogonal frequency-division multiplexing (CP-OFDM) signal having at least one orthogonal frequency-division multiplexing (OFDM) symbol, the at least one OFDM symbol having an associated time domain tail;
   truncating, by the transmitter, at least a portion of the time domain tail to produce a truncated OFDM signal; and
   transmitting, by the transmitter, the truncated OFDM signal.

2. The method of claim 1, wherein the time domain tail is produced by filtering of the original CP-OFDM signal by the transmitter.

3. The method of claim 1, wherein the time domain tail is a leading tail that is transmitted before transmission of a first cyclic prefix of the truncated OFDM signal, and wherein the truncating comprises refraining from transmitting an initial portion of the leading tail in the time domain.

4. The method of claim 1, wherein the time domain tail is a trailing tail that is transmitted after transmission of a last OFDM symbol of the truncated OFDM signal, and wherein the truncating comprises refraining from transmitting a final portion of the trailing tail in the time domain.

5. The method of claim 1, wherein a length of the time domain tail after the truncating is specified to be a fraction of at least one of:
   a length of a single OFDM symbol of the original CP-OFDM signal; or
   a length of a cyclic prefix of the original CP-OFDM signal.

6. The method of claim 1, wherein a length of the time domain tail after the truncating is specified to be a fraction of a length of a cyclic prefix of the original CP-OFDM signal.

7. A method comprising:
receiving, by a receiver, an original orthogonal frequency-division multiplexing (OFDM) signal having at least one OFDM symbol, the at least one OFDM symbol having an associated time domain tail;
truncating, by the receiver, at least a portion of the time domain tail to produce a truncated OFDM signal; and
processing, by the receiver, the truncated OFDM signal.

8. The method of claim 7, wherein the time domain tail is a trailing tail that is transmitted after transmission of a last OFDM symbol of the original OFDM signal, and wherein the truncating comprises ending processing of the last OFDM symbol before the trailing tail has ended in the time domain.

9. The method of claim 7, wherein a length of the time domain tail after the truncating is specified to be a fraction of at least one of:
a length of a single OFDM symbol of the original OFDM signal; or
a length of a cyclic prefix of the original OFDM signal.

10. The method of claim 7, wherein the truncating is performed on a delay-sensitive portion of the original OFDM signal that is processed before any other portion of the original OFDM signal is processed.

11. The method of claim 10, wherein the processing of at least one other portion of the original OFDM signal uses information from the delay-sensitive portion.

12. The method of claim 10, wherein the delay-sensitive portion includes a trailing tail that is transmitted after transmission of a last OFDM symbol of the delay-sensitive portion, wherein the truncating is performed on the trailing tail, and wherein the truncating comprises ending processing of the trailing tail before the trailing tail has ended in the time domain.

13. The method of claim 12, wherein processing of the last OFDM symbol of the delay-sensitive portion begins before an entirety of the trailing tail is received.

14. A transmitter comprising:
a non-transitory memory storage comprising instructions; and
one or more processors in communication with the memory storage, wherein the one or more processors execute the instructions to:
generate an original cyclic prefix orthogonal frequency-division multiplexing (CP-OFDM) signal having at least one orthogonal frequency-division multiplexing (OFDM) symbol, the at least one OFDM symbol having an associated time domain tail;
truncate at least a portion of the time domain tail to produce a truncated OFDM signal; and
transmit the truncated OFDM signal.

15. The transmitter of claim 14, wherein the time domain tail is produced by filtering of the original CP-OFDM signal by the transmitter.

16. The transmitter of claim 14, wherein the time domain tail is a leading tail that is transmitted before transmission of a first cyclic prefix of the truncated OFDM signal, and wherein the truncation comprises refraining from transmitting an initial portion of the leading tail in the time domain.

17. The transmitter of claim 14, wherein the time domain tail is a trailing tail that is transmitted after transmission of a last OFDM symbol of the truncated OFDM signal, and wherein the truncation comprises refraining from transmitting a final portion of the trailing tail in the time domain.

18. The transmitter of claim 14, wherein a length of the time domain tail after the truncation is specified to be a fraction of at least one of:
a length of a single OFDM symbol of the original CP-OFDM signal; or
a length of a cyclic prefix of the original CP-OFDM signal.

19. A receiver comprising:
a non-transitory memory storage comprising instructions; and
one or more processors in communication with the memory storage, wherein the one or more processors execute the instructions to:
receive an original orthogonal frequency-division multiplexing (OFDM) signal having at least one OFDM symbol, the at least one OFDM symbol having an associated time domain tail;
truncate at least a portion of the time domain tail to produce a truncated OFDM signal; and
process the truncated OFDM signal.

20. The receiver of claim 19, wherein the time domain tail is a trailing tail that is transmitted after transmission of a last OFDM symbol of the original OFDM signal, and wherein the truncation comprises ending processing of the last OFDM symbol before the trailing tail has ended in the time domain.

21. The receiver of claim 19, wherein a length of the time domain tail after the truncation is specified to be a fraction of at least one of:
a length of a single OFDM symbol of the original OFDM signal; or
a length of a cyclic prefix of the original OFDM signal.

22. The receiver of claim 19, wherein truncation is performed on a delay-sensitive portion of the original OFDM signal that is processed before any other portion of the original OFDM signal is processed.

23. The receiver of claim 22, wherein the processing of at least one other portion of the original OFDM signal uses information from the delay-sensitive portion.

24. The receiver of claim 22, wherein the delay-sensitive portion includes a trailing tail that is transmitted after transmission of a last OFDM symbol of the delay-sensitive portion, wherein truncation is performed on the trailing tail, and wherein the truncation comprises ending processing of the trailing tail before the trailing tail has ended in the time domain.

25. The receiver of claim 24, wherein processing of the last OFDM symbol of the delay-sensitive portion begins before an entirety of the trailing tail is received.

* * * * *